UNITED STATES PATENT OFFICE.

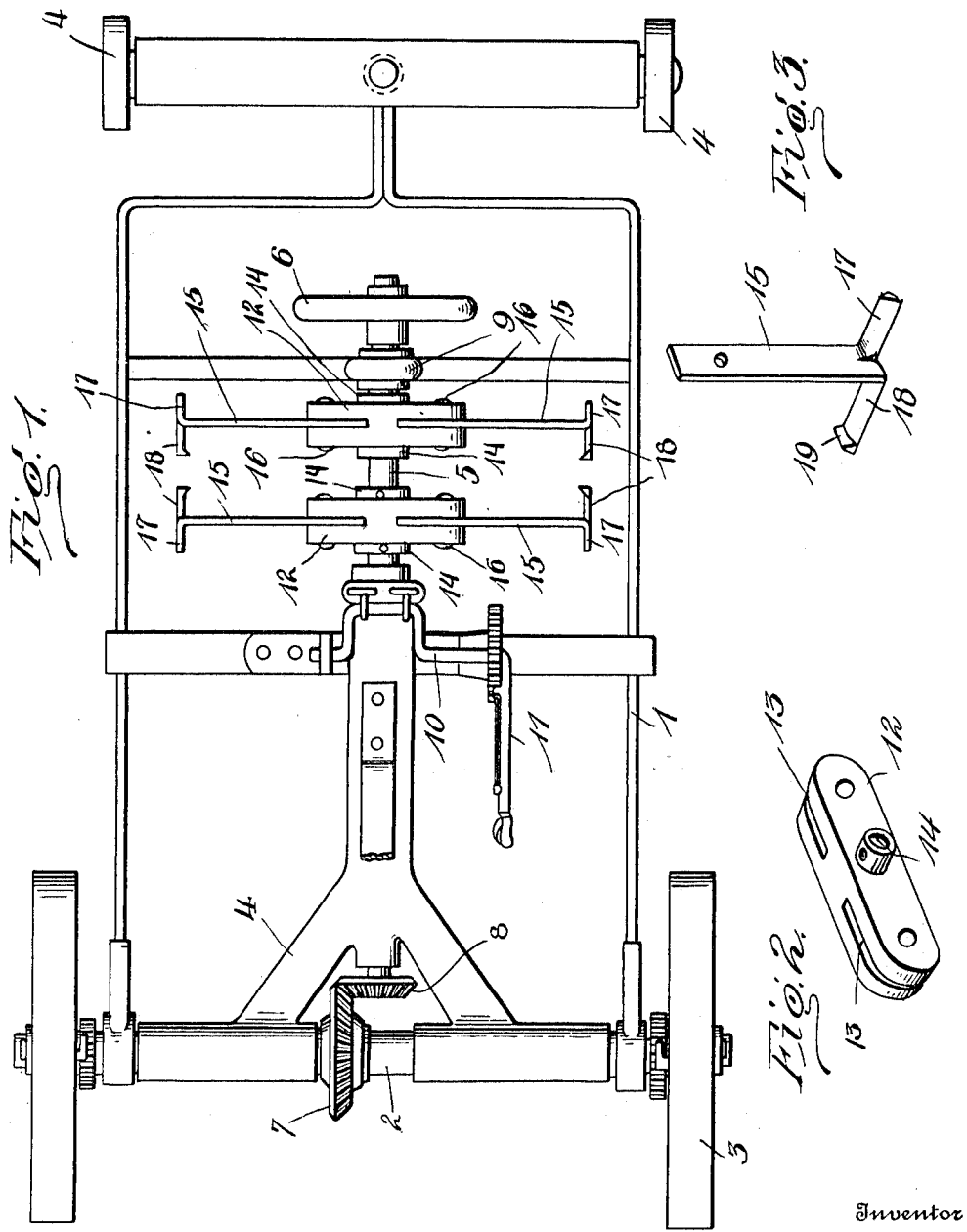

JOSEPH H. STONE, OF OKEMAH, OKLAHOMA.

BLADE FOR COTTON-CHOPPERS.

1,102,362.

Specification of Letters Patent.

Patented July 7, 1914.

Original application filed March 25, 1913, Serial No. 756,809. Divided and this application filed October 6, 1913. Serial No. 793,698.

*To all whom it may concern:*

Be it known that I, JOSEPH HENRY STONE, citizen of the United States, residing at Okemah, in the county of Okfuskee and State of Oklahoma, have invented certain new and useful Improvements in Blades for Cotton-Choppers, of which the following is a specification.

This application is a division of an application filed by me March 25, 1913, Serial No. 756,809.

The invention forming the subject-matter of the present application is an improvement in blades for cotton choppers, the object of the invention being to provide a novel blade by which some of the plants will be cut out so as to produce the necessary thinning and the straggling roots, leaves, and stems of the plants left standing will be cut away so that the said plants will be properly pruned and their development assured.

The invention is illustrated in the accompanying drawings and consists in certain novel features which will be first fully described and then particularly pointed out in the claims.

In the drawings: Figure 1 is a plan view of a cotton chopper embodying my improvement; Fig. 2 is a detail perspective view of one of the blade-carrying arms; Fig. 3 is a detail perspective view of one of the blades.

The cotton chopper of my invention comprises a frame 1 which is preferably of the U-shaped form shown and is hung loosely at its rear end upon an axle 2 actuated by ground wheels 3. At the front end of the frame is provided steering wheels 4 and between the sides of the frame an inner bearing frame is hung upon the axle and provides a longitudinal bearing for the chopper shaft 5 which is equipped with a fly-wheel 6 at its front end. The chopper shaft is actuated from the axle by a gear wheel 7 and pinion 8 and plays at its front end in a guide 9, all of which is fully set forth in my aforesaid application, Serial No. 756,809. A crank shaft 10 and lever 11 is provided so that the chopper shaft may be raised or lowered to cut through the plants at any desired depth.

At points in rear of the bearing or guide 9, I mount upon the chopper shaft blade-carrying arms 12 which extend radially from the shaft and are slotted or notched, as shown at 13, in their ends to receive the ends of the stems or shanks of the blades. The blade-carrying arms are provided with collars or tubular offsets 14 upon their opposite sides through which set-screws are inserted to secure the arms to the shaft at the desired points. The arms may thus be adjusted to the axle of the shaft so that the distance between the plants left standing may be regulated. The blades consist of a stem or shank 15, the inner end of which is inserted in the slot or notch 13 of the blade-carrying arm and is secured therein by a bolt or rivet 16 inserted transversely therethrough, as will be readily understood. The outer end of the stem or shank is bifurcated and the branches or arms thereby formed are bent in opposite directions from the stem, as shown at 17 and 18 and most clearly in Fig. 3. The advance edges of these members 17 and 18, considered with reference to the direction of rotation, are beveled and sharpened so that they will form cutting edges, as will be readily understood, and the extremity of the member 18 is turned slightly upward and sharpened, as shown at 19, so as to form a pruning lip.

It will be readily noted that the cutters are arranged in pairs and the shanks of the same are intended to pass at opposite sides of the plants which are to be retained. The rotation of the chopper shaft will be imparted directly to the blade-carrying arms and the blades so that the members 17 and 18 will pass through the ground and cut through the roots of the plants so that, as the machine progresses over the field, some of the plants will be cut out at regular intervals. The lips 19 are formed on those branches of the cutters which extend toward each other and are adapted to cut through straggling vines and the stems projecting from the plants to be left, so that the plants will be properly pruned and their development assured.

The blades are obviously simple in their construction so that they may be manufactured at a slight cost and should any one blade be broken or otherwise injured it may be easily removed from the arm to which it is attached and a new blade substituted without requiring the substitution of an entire set of blades.

What I claim is:—

1. A blade for cotton choppers comprising a shank having its outer end bifurcated, the branches of the bifurcation being extended in opposite directions from the shank to form cutting members and one of said members having an inwardly turned cutting lip at its end.

2. In a cotton chopper, the combination of a chopper shaft, blade-carrying arms secured thereon and disposed in pairs, and blades secured to said arms and extending therefrom and disposed radially of the shaft and provided at their outer ends with oppositely extending cutting members, the cutting members on the opposed sides of the adjacent stems being provided with inwardly turned cutting lips at their ends.

In testimony whereof I affix my signature in presence of two witnesses.

JOSEPH H. STONE. [L. S.]

Witnesses:
C. M. CARLYLE,
E. S. PELOT.

Copies of this patent may be obtained for five cents each, by addressing the "Commissioner of Patents, Washington, D. C."